(12) United States Patent
Ohsawa

(10) Patent No.: US 6,411,270 B1
(45) Date of Patent: Jun. 25, 2002

(54) DISPLAY APPARATUS CAPABLE OF SELECTING DISPLAY PICTURE OR SCREEN SIZES FOR DISPLAYING STATIC PICTURE OF IMAGES WRITTEN IN A SPATIAL LIGHT MODULATOR

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/143,111

(22) Filed: Aug. 28, 1998

(30) Foreign Application Priority Data

Sep. 1, 1997 (JP) ............................................. 9-236316

(51) Int. Cl.[7] ............................ H04N 9/12; H04N 9/31; G02F 1/135; G02B 26/00; G03B 21/00

(52) U.S. Cl. .............................. 345/84; 345/38; 345/45; 345/87; 348/763; 348/766; 349/1; 349/12; 349/27; 349/33; 349/25; 359/292; 359/293; 359/294; 359/295; 353/122

(58) Field of Search ................................ 358/487, 471, 358/475, 480, 509, 512, 451, 498; 382/211, 312; 359/292, 293, 294, 295; 348/766, 744, 750, 758, 759, 761–763, 768; 349/1, 2, 5, 7, 12, 14, 27, 33, 34, 116; 345/84, 36, 87, 88, 50.51, 89, 76, 102, 104, 204, 214, 738, 45, 48, 10

(56) References Cited

U.S. PATENT DOCUMENTS

| | | | | |
|---|---|---|---|---|
| 5,132,811 A | * | 7/1992 | Iwaki | 359/6 |
| 5,150,226 A | * | 9/1992 | Takanashi | 358/471 |
| 5,327,263 A | * | 7/1994 | Katagiri | 358/471 |
| 5,384,649 A | * | 1/1995 | Takanashi | 359/67 |
| 5,416,561 A | * | 5/1995 | Sawano | 355/43 |
| 5,502,490 A | * | 3/1996 | Takanashi | 358/296 |
| 5,544,252 A | * | 8/1996 | Iwaki | 382/280 |
| 5,565,882 A | * | 10/1996 | Takanashi | 345/32 |
| 5,617,203 A | * | 4/1997 | Kobayshi | 356/237.5 |
| 5,777,696 A | * | 7/1998 | Inoue | 348/752 |
| 5,798,806 A | * | 8/1998 | Tsutsui | 349/29 |
| 5,847,778 A | * | 12/1998 | Muto | 348/759 |
| 5,883,681 A | * | 3/1999 | Kono | 348/571 |
| 5,920,664 A | * | 7/1999 | Hirabayashi | 385/16 |
| 5,959,763 A | * | 9/1999 | Bozler | 359/290 |
| 6,309,075 B1 | * | 10/2001 | Ohsawa | 353/122 |

FOREIGN PATENT DOCUMENTS

| | | | | |
|---|---|---|---|---|
| JP | 5-157984 | 6/1993 | | |
| JP | 9-15732 | 1/1997 | | |
| JP | 2000131662 | * 10/1998 | ............. | G02F/1/13 |

* cited by examiner

Primary Examiner—Matthew Luu
Assistant Examiner—Wesner Sajous
(74) Attorney, Agent, or Firm—Fitzpatrick, Cella, Harper & Scinto

(57) ABSTRACT

A spatial light modulator includes a pair of transparent substrates disposed with a prescribed gap therebetween and each having thereon a transparent electrode, and a liquid crystal layer and a photoconductor layer disposed between the substrates, with the transparent electrode on one substrate being split into a plurality of split electrodes. A display apparatus is formed by disposing a recording medium carrying a recorded picture at different sizes between the spatial light modulator and a writing light source. Depending on the picture size to be displayed on the spatial light modulator, a number among the plurality of split electrodes are selected for writing voltage application under illumination with writing light based on picture size data recorded in the recording medium, whereby a selected size of picture is written in the spatial light modulator and displayed thereon under illumination with reading light.

9 Claims, 9 Drawing Sheets

DISPLAY APPARATUS CAPABLE OF SELECTING DISPLAY PICTURE OR SCREEN SIZES FOR DISPLAYING STATIC PICTURE OF IMAGES WRITTEN IN A SPATIAL LIGHT MODULATOR

FIELD OF THE INVENTION AND RELATED ART

The present invention relates to a display apparatus for displaying a static picture, particularly such a display apparatus capable of selecting display picture or screen sizes.

Hitherto, there has been proposed a type of display apparatus for displaying a static picture wherein a negative or positive image recorded in a photographic film, etc., is written in a spatial light modulator (SLM) and is read out therefrom for viewing. Our research and development group also has proposed a display apparatus wherein a picture or image recorded in a negative film is written into an SLM at one time by illumination with writing light and reproduced therefrom for viewing (Japanese Laid-Open Patent Application (JP-A) 9-15732 (corr. to U.S. Application. Ser. No. 08/644683)).

On the other hand, as a recent practice in photography, photographing is sometimes performed while selecting a picture size, and more specifically in an advanced photography system wherein a photography film is provided with a magnetic coating so as to record a picture size, a selection from three picture sizes of H size, C size and P size is allowed.

In a conventional static picture display apparatus using a spatial light modulator, such films carrying different sizes of pictures are viewed through respective aperture mask means for reading light (e.g., as disclosed in JP-A 5-157984).

In case of providing separate movable mask means, etc., corresponding to sizes of pictures to be reproduced, it is necessary to use a larger and expensive apparatus.

SUMMARY OF THE INVENTION

In view of the above-mentioned problems of the prior art, an object of the present invention is to provide a compact and inexpensive display apparatus allowing observation or viewing of films carrying different sizes of pictures.

According to the present invention, there is provided a display apparatus, comprising: a spatial light modulator capable of writing therein and displaying a picture, a recording medium carrying a recorded image and disposed in front of the spatial light modulator, and a writing light source disposed in a position suitable for emitting writing light and illuminating the recording medium with the writing light to project the recorded image onto the spatial light modulator, wherein said spatial light modulator comprises a pair of transparent substrates disposed with a prescribed gap therebetween and each having thereon a transparent electrode, and a liquid crystal layer and a photoconductor layer disposed between the substrates, the transparent electrode on one substrate being split into a plurality of split electrodes, and said display apparatus further includes:

a voltage application means for applying a writing voltage to the plurality of split electrodes independently, a picture size selection means for selecting a size of picture displayed on the spatial light modulator, an electrode selection means for selecting a split electrode for writing voltage application depending on the selected picture size, and a control means for controlling the voltage application means so as to select the split electrode for writing voltage application based on an output of the picture size selection means and corresponding to the selected picture size, controlling the voltage application means to apply the writing voltage to the selected split electrode, and controlling the writing light source so as to illuminate the recording medium and project the recorded image thereon as a writing image onto the spatial light modulator.

According to another aspect of the present invention, there is provided a display apparatus, comprising: a spatial light modulator capable of writing therein and displaying a picture, a recording medium carrying a recorded image and disposed in front of the spatial light modulator, and a writing light source disposed in a position suitable for emitting writing light and illuminating the recording medium with the writing light to project the recorded image onto the spatial light modulator, wherein said spatial light modulator comprises a pair of transparent substrates disposed with a prescribed gap therebetween and each having thereon a transparent electrode, and a liquid crystal layer and a photoconductor layer disposed between the substrates, the transparent electrode on one substrate comprising a plurality of transparent electrode layers having mutually different planar sizes and laminated with each other, and a voltage application means for applying a writing voltage to the plurality of transparent electrode layers independently from each other, a picture size selection means for selecting a size of selection means for selecting a size of picture displayed on the spatial light modulator, an electrode selection means for selecting a transparent electrode layer for writing voltage application depending on the selected picture size, and a control means for controlling the voltage application means so as to select the transparent electrode layer for writing voltage application based on an output of the picture size selection means and corresponding to the selected picture size, controlling the voltage application means to apply the writing voltage to the selected transparent electrode layer, and controlling the writing light source so as to illuminate the recording medium and project the recorded image thereon as a writing image onto the spatial light modulator.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
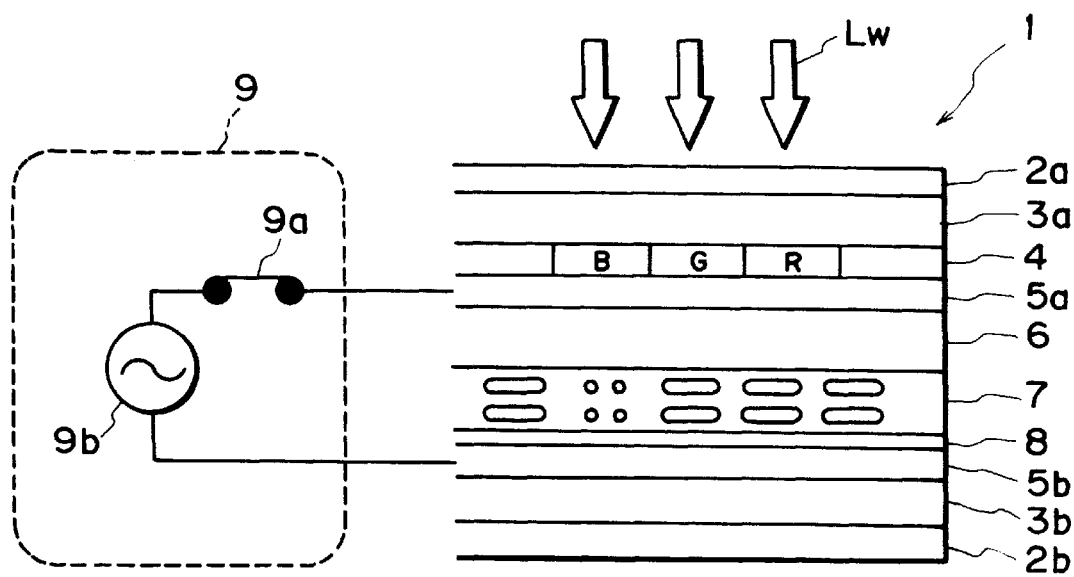
FIG. 1 is a schematic sectional illustration for illustrating a sectional structure and a picture writing principle of a spatial light modulator constituting a first embodiment of the display apparatus according to the present invention.
Figure 2:
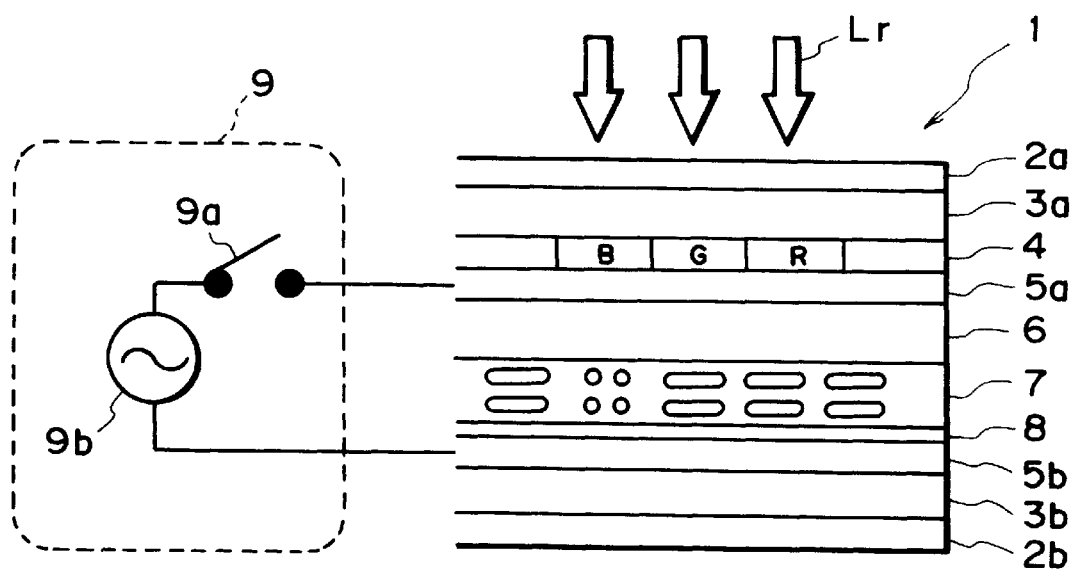
FIG. 2 is a schematic sectional illustration of the spatial light modulator for illustrating the picture readout principle thereof.

FIG. 1 is a schematic sectional illustration of a spatial light modulator constituting a display apparatus according to a first embodiment of the present invention.

Referring to FIG. 1, the display apparatus includes a spatial light modulator (hereinafter, sometimes abbreviated as "SLM") 1 capable of writing therein and reading out therefrom of a picture. The SLM 1 includes a pair of substrates 3a and 3b provided on their outer surfaces with first and second polarizers 2a and 2b, respectively, and a liquid crystal and inner members, such as electrodes, disposed between the pair of substrates 3a and 3b. More specifically, between the substrates 3a and 3b, there are provided a color filter 4 of primary colors of pure colors or colors complementary thereto, first and second transparent electrodes 5a and 5b, a photoconductor layer 6 comprising a film of amorphous conductor, organic semiconductor, etc., a liquid crystal layer 7 comprising a liquid crystal having a memory characteristic, such as chiral smectic liquid crystal showing ferroelectricity, and an alignment film 8 formed on one-side transparent electrode 5b, which are disposed in lamination.

The first and second polarizers 2a and 2b are disposed in cross nicols having their polarization directions crossing each other at right angles. In case where the liquid crystal layer 7 is composed of a chiral smectic liquid crystal showing ferro-electricity, the liquid crystal layer 7 may have a sufficiently small thickness and may form smectic layers disposed to have a common normal so that liquid crystal molecules in the smectic layers are aligned to provide longer molecular axes thereof forming a certain constant angle from the normal. The angle can be changed under application of an electric field and can be retained after removal of such an electric field.

Further, by appropriately selecting a relationship between the liquid crystal molecular alignment direction and the polarization directions of the first and second polarizers 2a and 2b, it is possible to selectively form a type of SLM which is opaque before voltage application (i.e., a whole-area reset state) and becomes locally transparent after local voltage application or a type of SLM which is transparent before voltage application (in a reset state) and becomes locally opaque after local voltage application. The former-type SLM is suited for viewing a positive picture (or image) formed from a positive picture, and the latter-type SLM is suited for viewing a positive picture (or image) formed by inversion from a negative picture.

FIG. 1 also shows a voltage application means 9 including a switch 9a and a voltage supply 9b or applying a prescribed voltage between the first and second transparent electrodes 5a and 5b at the time of picture writing.

At the time of picture writing when writing light Lw carrying picture data is incident to SLM 1 having a structure as described above, and a switch 9a is turned on to apply a prescribed voltage between the first and second transparent electrodes 5a and 5b, the writing light Lw having passed through the first polarity 2a and the first substrate 3a is incident to the color filter (segments) 4 to be color-separated and enter the photoconductor layer 6 after passing the first transparent electrode 5a.

The photoconductor layer 6 is caused to have a locally lower electric resistance when illuminated with light having a locally stronger light intensity, so that a portion of the liquid crystal layer having received stronger light intensity is supplied with a larger electric field exceeding a certain threshold to cause a local liquid crystal molecule alignment angle change, e.g., in the case of a chiral smectic liquid crystal showing ferroelectricity. Accordingly, the liquid crystal molecular alignment angle change is caused by picture data including color data and light intensity of the writing light Lw, thereby effecting a local writing of picture or image. The picture writing is completed by terminating the illumination with writing light and/or the voltage application between the transparent electrodes 5a and 5b.

Even after the termination of voltage application by turning off the switch 9a, the local liquid crystal alignment angle of liquid crystal molecules forming an image is retained (in a memory state) by the characteristic of the chiral smectic liquid crystal showing ferroelectricity. Accordingly, if the SLM 1 in this locally written state (carrying image data) is illuminated with uniform light as readout light Lr incident thereto in an identical direction as the writing light Lw, the written image can be viewed from a side opposite to the reading light illumination side.

In order to reset (or erase) the once-written image, SLM 1 may be supplied with a voltage of a polarity opposite to that applied at the time of writing between the first and second electrodes 5a and 5b without being supplied with illumination light.

Figure 3:
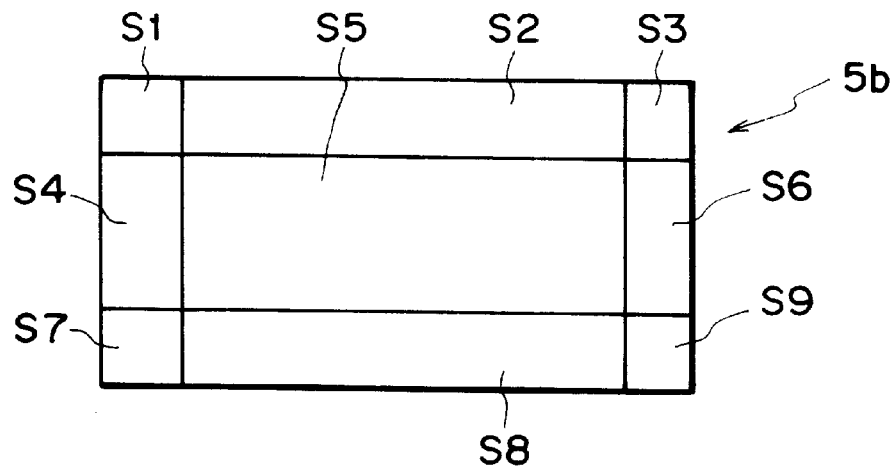
FIG. 3 illustrates a transparent electrode split pattern formed on one substrate of the spatial light modulator.

In the present invention, either one of the first and second transparent electrodes 5a and 5b (the second transparent electrode 5b in this embodiment) is split into, e.g., 9 segments S1–S9 as shown in FIG. 3. Each of such split electrode segments S1–S9 is hereinafter called a "split electrode".

Figure 4A:
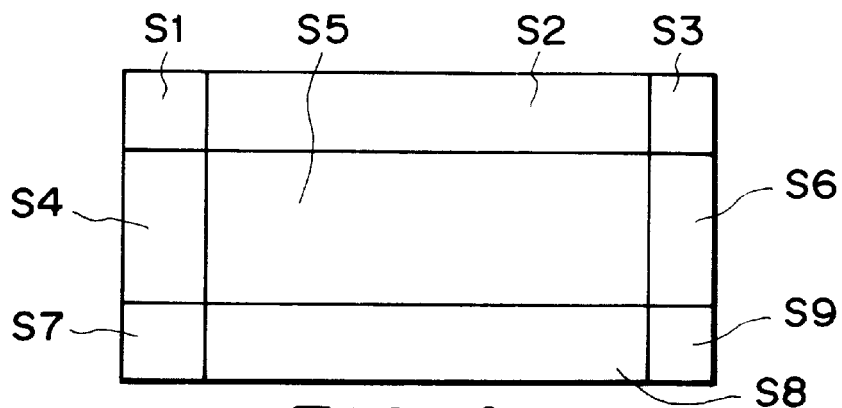
FIGS. 4A, 4B and 4C illustrate picture sizes of H size, C size and P size, respectively.
Figure 4B:
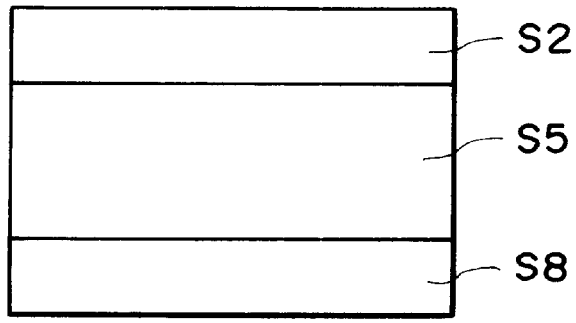
Figure 4C:
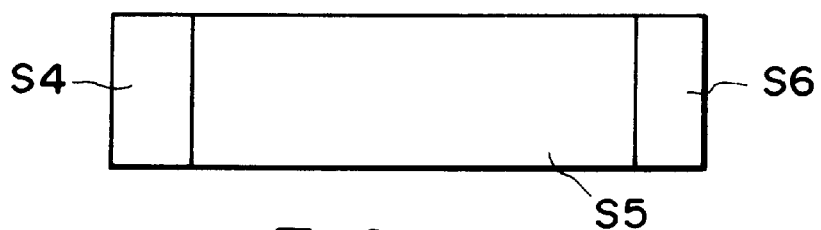

Now, if all the split electrodes S1–S9 are used for picture display, an H-size picture as mentioned above and as shown in FIG. 4A may be given. Further, if only split electrodes S2, S5 and S8 are used for picture display, a C-size picture as shown in FIG. 4B is given. Further, if only split electrodes S4, S5 and S6 are used for picture display, a P-size picture as shown in FIG. 4C is given.

Figure 5:
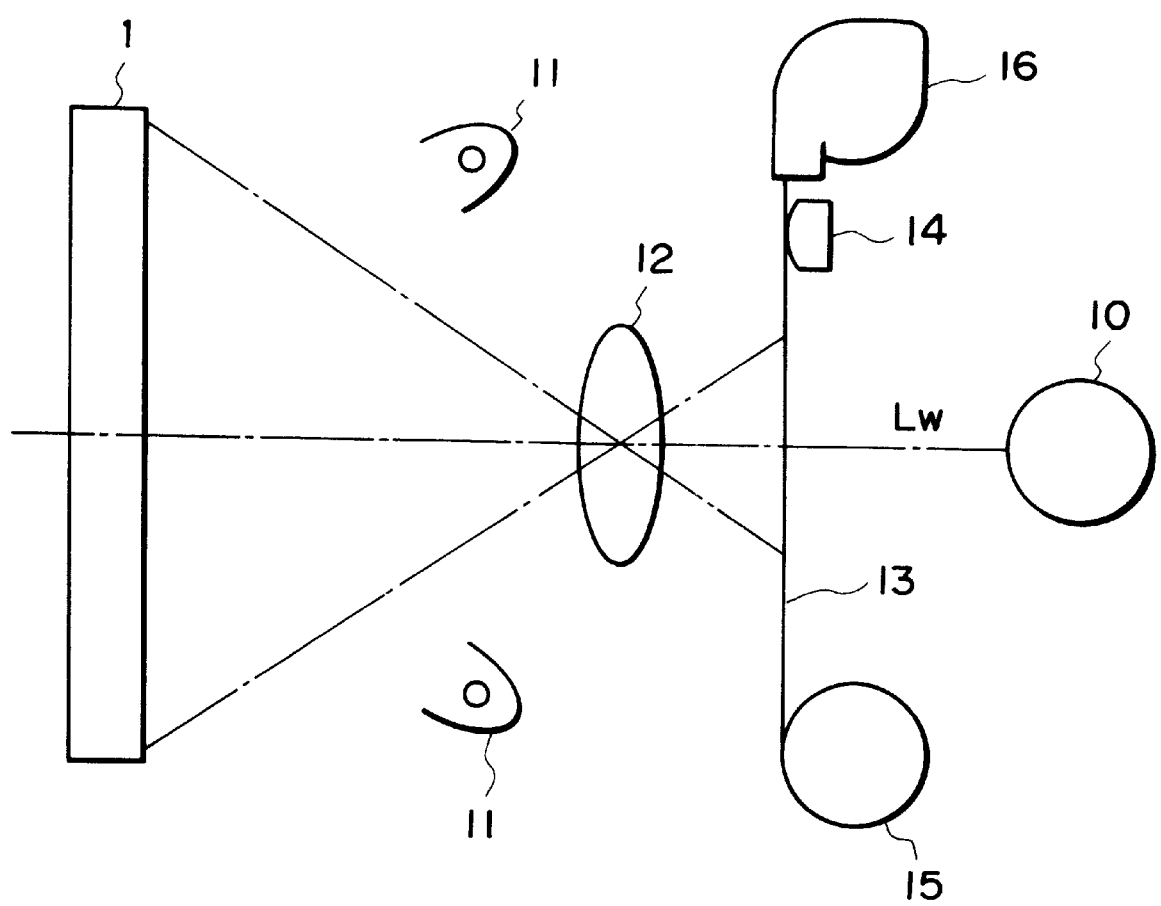
FIG. 5 illustrates an optical arrangement of an apparatus including the modulator shown in FIG. 1.

FIG. 5 is a view for illustrating principally an optical arrangement of a display apparatus for displaying a static picture according to this embodiment.

Referring to FIG. 5, the display apparatus includes a writing light source 10 and a reading light source 11. The writing light source 10 is disposed so as to allow the illumination of the SLM 1 with writing light Lw, and the writing light Lw from the writing light source 10 is caused to pass through a film 13 carrying any one of plural sizes of pictures and through a projection lens 12 to form a focused image on SLM 1. A recorded image having an H-, C- or P-size picture on the film 13 may ordinarily be projected in an enlarged size corresponding to the picture area size of SLM 1.

On the other hand, the reading light source 11 is disposed so as to allow a uniform illumination of SLM 1 with reading light Lr. In the embodiment shown in FIG. 5, two reading light sources are used, but the number thereof may be appropriately selected in view of uniform illumination and required brightness of display. It is also possible to use a diffusion plate, etc., as desired for providing an improved illumination uniformity, etc.

Referring to FIG. 5, the display apparatus further includes a magnetic head 14 disposed in proximity to a film 13 for reading magnetic data regarding picture sizes recorded on the film 13. The film 13 is fed out from a film cartridge 16 and taken up by a take-up spool 15.

Figure 6:
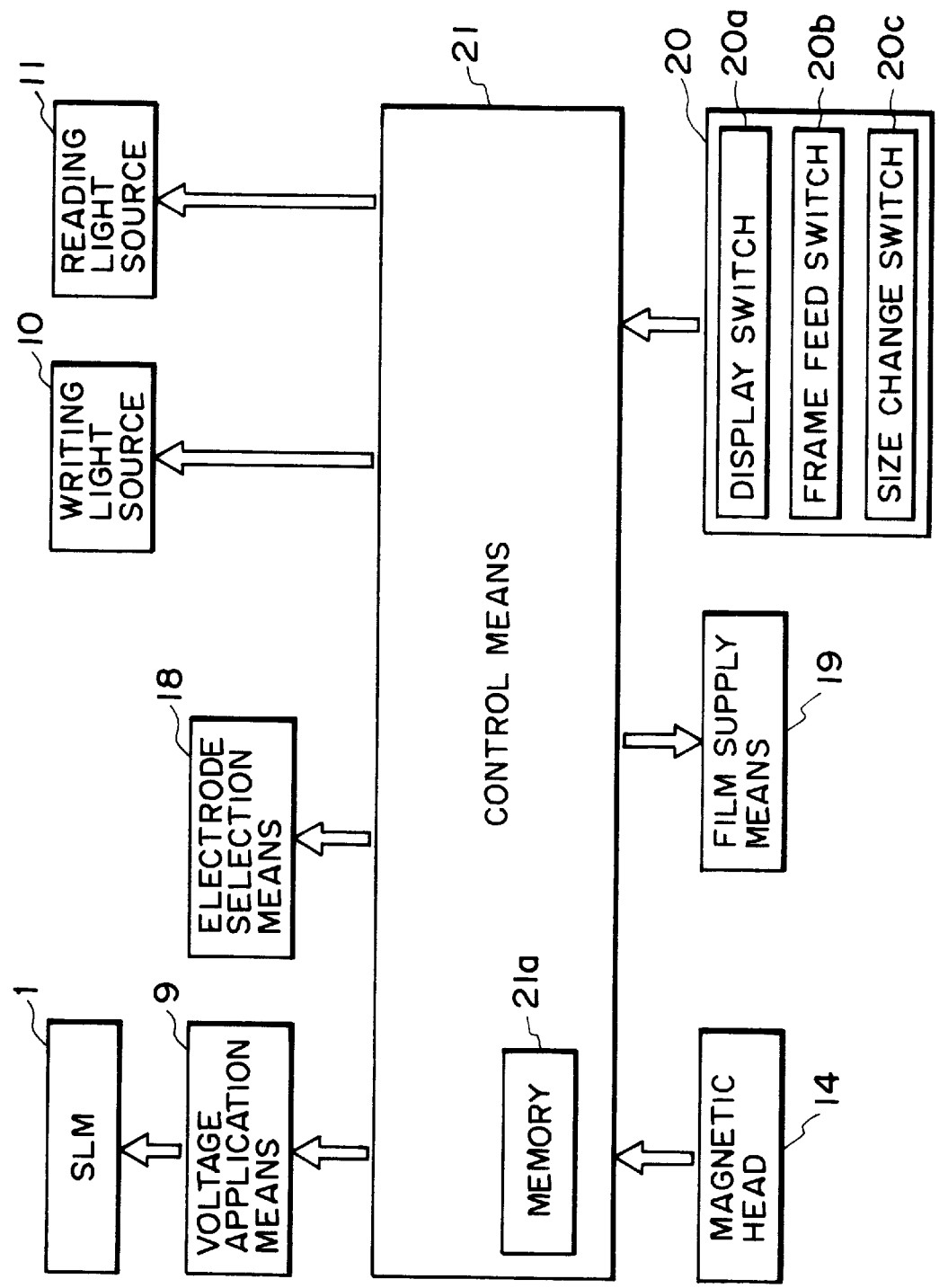
FIG. 6 is a block diagram for illustrating control means for a display apparatus including the modulator shown in FIG. 1.

FIG. 6 is a block diagram for illustrating a control circuit structure for the display apparatus. Referring to FIG. 6, the control circuit includes an electrode selection means 18 for exchangeably selecting electrodes for voltage application by a voltage application means 9 among the split electrodes S1–S9 of the second transparent electrode 5b of SLM 1 described above, a film supply means 19 for feeding and taking up the film 13, and operation switches 20 including a display switch 20a, a frame feed switch 20b and a size change switch 20c constituting a picture size selection means.

The control circuit is principally constituted by a control means 21, such as a micro-computer, for controlling the electrode selection means 18 based on outputs of the magnetic head 14 and the size change switch 20c, so as to select split electrodes to be supplied with a writing voltage, control the voltage application means to apply the writing voltage to the selected split electrodes and operate the writing light source to project a writing image onto the SLM 1.

Figure 8:
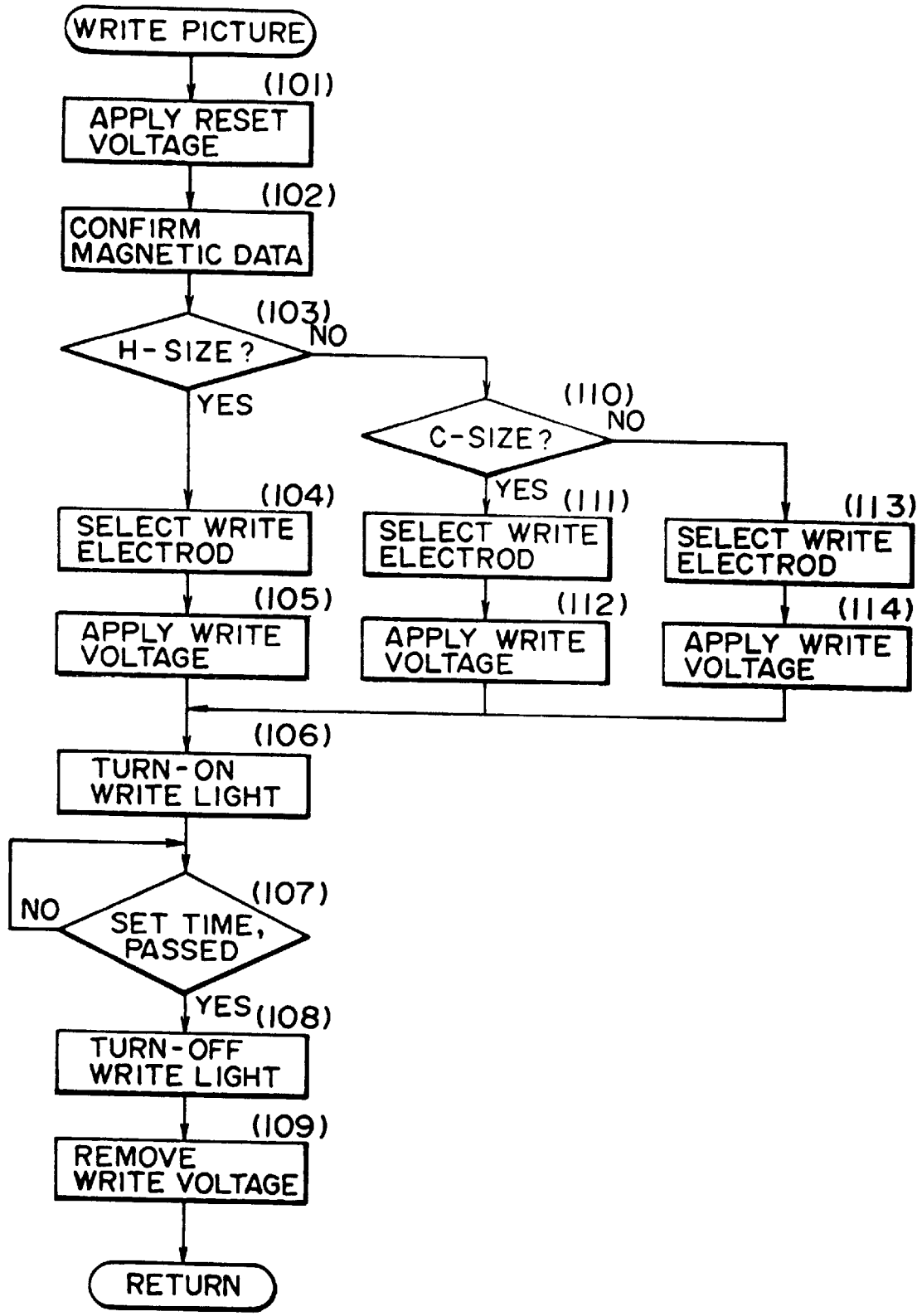
FIG. 8 is a flow chart for illustrating a picture-writing sequence of the control means shown in FIG. 6.
Figure 9:
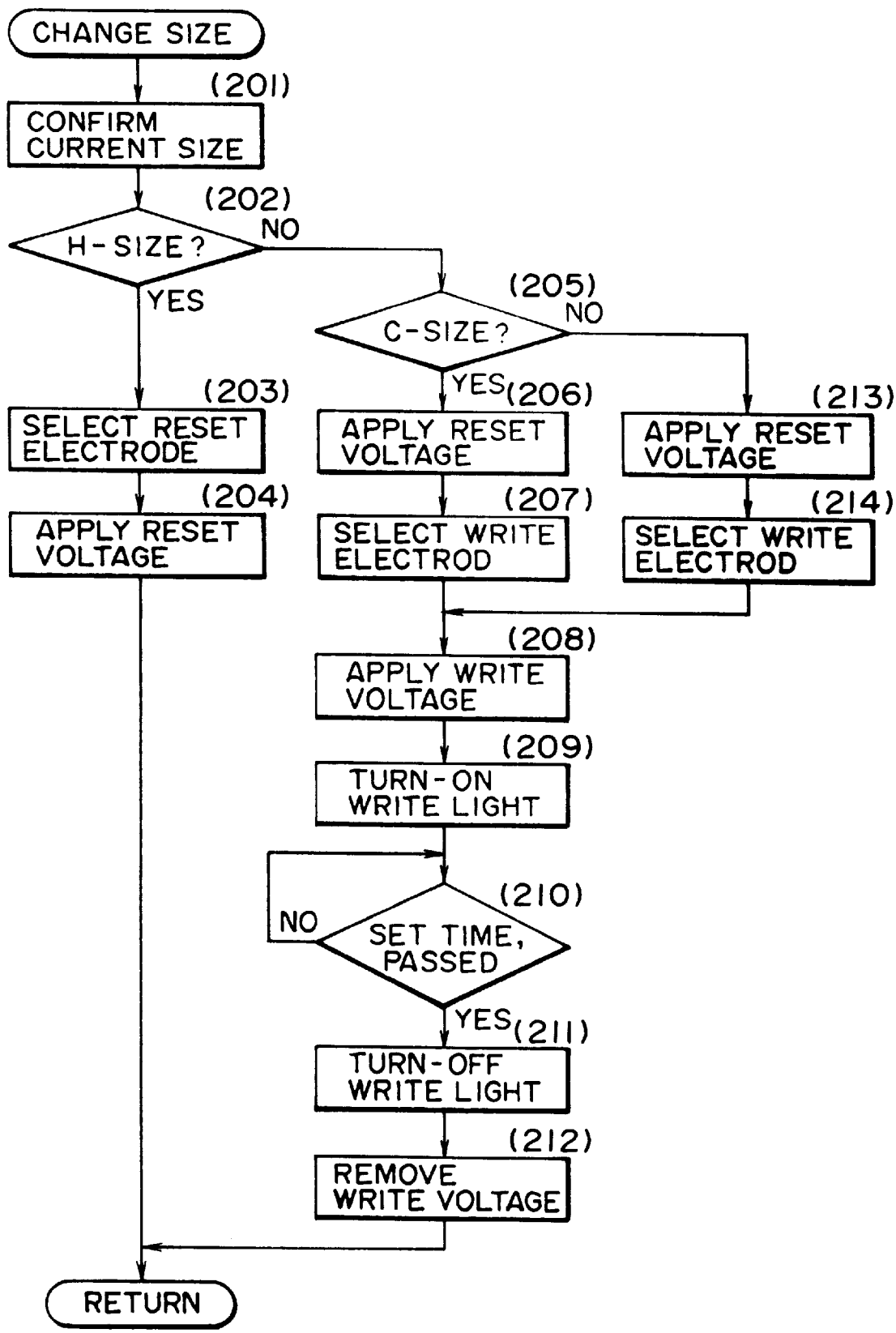
FIG. 9 is a flow chart for illustrating a picture size-changing sequence of the control means shown in FIG. 6.

The control operation by the control means 21 As will now be described additionally with reference to flow charts of FIGS. 7–9.

Figure 7:
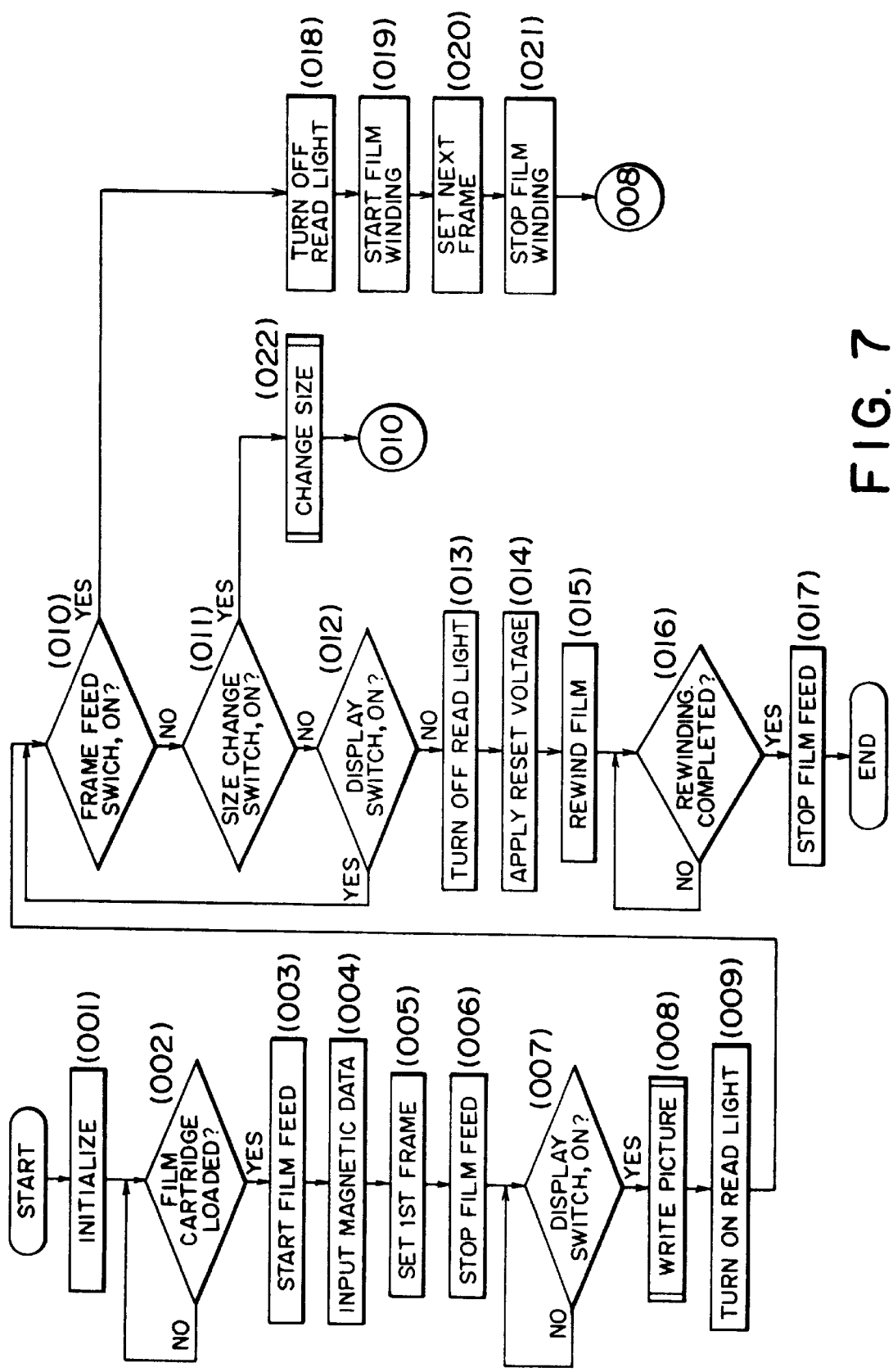
FIG. 7 is a flow chart for illustrating an entire sequence of the control means shown in FIG. 6.

When a power supply switch (not shown) is turned on to make the control means 21 operable, the control means 21 first initialize necessary memories, outputs, etc., as shown in FIG. 7 (step 001). By the initialization, the writing light source 10 and reading light source 11 are turned off and no output is made from the voltage application means.

Then, when a film cartridge 16 is loaded in the display apparatus in this state (Y at step 002), a signal is outputted to the film supply means 19 to start the film feed (step 003). While feeding the film 13 in this way, magnetic data, e.g., regarding the picture size recorded in the film at the time of recording is read out therefrom by the magnetic head 14 for inputting (step 004) and recorded in the memory 21 (FIG. 6).

When magnetic data for all the picture frames are inputted and stored in the memory 21a, a control signal is supplied to the film supply means 19, a first frame of the photographed figure is set at the writing position (step 005). Then, the signal output to the film supply means 19 is stopped to stop the film feed (step 006) and wait for turning-on of the display switch 20a among the operation switches 20 (step 007).

Then, when the display switch is turned on (Y at step 007), a sequential operation for writing a picture on the film 13 into SLM 1 is performed (step 008), details of which will be described later with reference to the flow chart of FIG. 8.

After completion of the picture writing sequence, the reading light source 11 is turned on (step 009) to allow the picture to be viewed.

Thereafter, whether the frame feed switch 20b among the operation switches 20 is ON or OFF is checked (step 010), and if the-frame feed switch 20b is OFF (N at step 010), it is checked whether size-change switch 20c (in the operation switches 20) is ON or OFF (step 011).

Then, if the size-change switch 20c is off (N at step 011), On or OFF of the display switch is checked, and if the display switch 20a is ON (Y at step 012), the sequence is returned to the step 010 to repeat the switch check sequence.

On the other hand, if the display switch is turned OFF (N at step 012), the reading light source 11 is turned OFF (step 013), whereby the picture written on SLM 1 is placed in a non-viewable state.

Thereafter, a control signal is outputted to the voltage application means 9 and the voltage selection means 18, to apply a voltage (whole-area reset voltage) of a polarity opposite to that during picture writing to the respective electrodes of SLM 1 (step 014), whereby the picture written in SLM 1 is erased or cleared.

Then, a control signal is supplied to the film supply means 19 to start re-winding of the film (step 015) until the rewinding of the film into the cartridge is completed (Y at step 016). Thereafter, the signal output to the film supply means 19 is terminated to stop the film feed (step 017). Up to now, an operation cycle is completed, and a subsequent cycle is started from the step 001.

On the other hand, if the frame feed switch 20b is ON at step 010 (Y at step 010), the reading light source 1 is turned OFF (step 018), to make SLM 1 un-viewable.

Then, a control signal is supplied to the film supply means 19 to start winding-up of the film (step 019) to set a subsequent frame of the film at the writing position (step 020), and then the control signal is stopped to be supplied to the film supply means, thereby stopping the film winding-up (step 021). Thereafter, returning to the above-mentioned step 008, picture writing is performed, followed by the step 009 for turning-on the reading light to provide a viewable state.

On the other hand, if the size change switch 20c is ON at the above-mentioned step 011 (Y at step 011), a sequential operation for changing the picture written in the SLM 1 (step 022) is performed, detail of which will be described later with reference to the flow chart of FIG. 9.

Next, the picture writing sequence at the step 008 will be described in further detail with reference to the flow chart of FIG. 8.

At the time of picture writing, the control means 21 supplies a control signal to the voltage application means 9 and the electrode selection means 18 so as to apply a voltage (whole-area reset voltage) of a polarity opposite to that of the writing voltage to the respective electrodes of SLM 1 (step 101), thereby erasing a possibly remaining picture on SLM 1.

Then, among the magnetic data regarding the respective frames recorded at the time of photographing and read out to be stored in the step 004, the magnetic data regarding a frame currently set in the writing position is read out from the memory 21a to confirm the picture size data selected at the time of photographing (step 102).

Then, whether or not the picture size data for the frame currently set in the writing position is H-size is checked (step 103), and if yes (Y at step 103), a control signal is supplied to the electrode selection means 18 so as to effect a picture writing according to the H-size to select all the split electrodes S1–S9 (FIG. 4A) as the writing electrodes (step 104), and also a control signal is supplied to the voltage application means 9 to apply a writing voltage to the selected scanning electrodes S1 to S9 (step 105). Thereafter, the writing light source 10 is turned on (step 106), to start projection of a picture on the film 13 onto SLM 1.

Then, after lapse of a prescribed time necessary for the picture writing,(Y at step 107), the writing light source 10 is turned off (step 108), and the writing voltage applied to the split electrodes S1–S9 is removed (step 109), thereby completing the picture writing in SLM 1.

As described above, in the case of the picture size being H, a picture is written into the area of all the split electrodes.

On the other hand, in case where the picture size of the current frame is not H (N at step 103), then whether the picture size is C or not is checked (step 110), and if yes (Y at step 110), a control signal is supplied to the electrode selection means 18 so as to effect a picture writing according to the C-size to select the split electrodes S2, S5 and S8 (FIG. 4B) as writing electrodes (step 111), and also a control signal is applied to the voltage application means 9 to apply a writing voltage to the selected split electrodes S2, S5 and S8 (step 112).

Thereafter, the picture writing is performed according to the step 106 and following similarly as in the case of H-size, but at the area of split electrodes not supplied with a voltage, no picture writing is effected even if light image projection is performed, so that the picture writing is effected selectively in the area of split electrodes S2, S5 and S8 (C-size area) of SLM 1.

On the other hand, in case where the picture size of the current frame is not C (N at step 110), then the current picture size is judged to be P-size, and a control signal is supplied to the electrode selection means 18 so as to effect a picture writing according to the P-size to select the split electrodes S4, S5 and S6 (FIG. 4C) as writing electrodes (step 113), and also a control signal is applied to the voltage application means 9 to apply a writing voltage to the selected split electrodes S4, S5 and S6 (step 114).

Thereafter, the picture writing is performed according to the step 106 and following similarly as in the case of H-size, but at the area of split electrodes not supplied with a voltage, no picture writing is effected even if light image projection is performed, so that the picture writing is effected selectively in the area of split electrodes S4, S5 and S6 (P-size area) of SLM 1.

Next, the picture size change sequence (at the step 202 in FIG. 7) will be described in further detail with reference to the flow chart of FIG. 9.

First, a case of picture size change from H-size to C-size or P-size is described. In this case, the control means 21 first confirms the current picture size written in SLM 1 (step 201) and checks whether it is H-size or not (step 202).

The current size of H-size means that the current picture is written in all the split electrodes S1–S9. The size change from this state into C-size may be effected by erasing or clearing the areas of split electrodes except for those of split electrodes S2, S5 and S8 corresponding to the C-size. Similarly, the size change from H-size to P-size may be effected by erasing the areas of split electrodes except for those of split electrodes S4, S5 and S6 corresponding to the P-size.

Accordingly, if the current size is confirmed to be H-size (Y at step 202), some split electrode area to be erased for a required size change is selected by supplying a control signal to the electrode selection means 18 (step 203), and a control signal is supplied to the voltage application means 9 to apply a reset, erasure or clear voltage to the respective selected split electrodes (step 204).

More specifically, in case of size change to C-size, the picture written in the area of split electrodes S1, S3, S4, S6, S7 and S9 is erased to leave the picture of the area of split electrodes S2, S5 and S8 as it is.

On the other hand, in case of size change to P-size, the picture written in the area of split electrodes S1, S2, S3, S7, S8 and S9 is erased to leave the picture at the area of split electrodes S4, S5 and S6 as it is. In this way, the size change from H-size may be completed.

Next, the picture size change from C-size to H-size or P-size is explained. In this case, it is first confirmed that the current size is not H-size (N at step 202), and then whether or not the current size is C-size is checked (step 205).

The size change from C-size to H-size or P-size cannot be effected by simply erasing some split electrode area as in the above-mentioned case of size change from H-size to another size but requires once resetting the picture written in SLM 1 and then rewriting in SLM 1.

Accordingly, when the current size is confirmed to be C-size (Y at step 205), control signals are supplied to the voltage application means 9 and the electrode selection means 18 to apply a reset voltage of a polarity opposite to that of the writing voltage to the area of split electrodes S2, S5 and S8 (step 206), thereby erasing the picture written in SLM 1.

Then, depending on a picture size after the size change, all the split electrodes S1–S9 in case of H-size, or the split electrodes of S4–S6 in case of P-size, are selected as writing electrodes by applying a control signal to the electrode selection means 18 (step 207), and a control signal is applied to the voltage application means 9 to apply a writing voltage to the respective selected split electrodes (step 208). Then, a writing light source 10 is turned on (step 209) to project a picture on the film 13 onto SLM 1.

After lapse of a prescribed time required for picture writing (Y at step 210), the writing light source 10 is turned off (step 211), and the control signal output to the voltage application means 9 is stopped to remove the writing voltage applied to the selected split electrodes (step 212), thereby completing the rewriting into SLM 1 after the size change.

On the other hand, in case where the current size is not C-size at step 205 (N at step 205), the current size is judged to be P-size. Again, the size change from P-size to H-size or C-size cannot be effected by simply erasing some split electrode area but requires once resetting the picture written in SLM 1 and then rewriting in SLM 1.

Accordingly, when the current size is judged to be P-size (N at step 205), control signals are supplied to the voltage application means 9 and the electrode selection means 18 to apply a reset voltage of a polarity opposite to that of the writing voltage to the area of split electrodes S4, S5 and S6 (step 213), thereby erasing the picture written in SLM 1.

Then, depending on a picture size after the size change, all the split electrodes S1–S9 in case of H-size, or the split electrodes of S2, S5 and S8 in case of C-size, are selected as writing electrodes by applying a control signal to the electrode selection means 18 (step 214). Thereafter, the sequence of the step 208 and following is followed to effect the rewriting after the picture size change.

As described above, a picture of selected picture size can be written into SLM 1 by selecting split electrodes from a plurality of split electrodes S1–S9 depending on the outputs of the magnetic head 14 and the size change switch 20c and controlling the voltage application means to apply a voltage to the selected split electrodes.

In the above description regarding a picture size selection, an embodiment wherein no writing voltage is applied at the time of picture writing to an area of split electrodes where no picture is required to be written. In such a case, if a type of SLM wherein a negative image recorded on a film is inverted to be viewed as a positive image, the area of no writing voltage application is viewed as a white image or a white zone.

However, in some cases, it is preferred that no image area is viewed as a black image. In such case, it is possible to apply a voltage exceeding a prescribed voltage (that has an identical polarity as but higher voltage than the writing voltage) to the area of split electrodes for no picture writing so as to provide a black inverted image regardless of writing light intensity incident thereto. As a result, a black image is formed at the split electrode area for no picture writing.

In the above-described embodiment, the second transparent electrode 2a on one substrate 1b is separated in plane into split electrodes depending on required picture sizes, but in case of providing split electrodes, it is necessary to leave some insulating spacing between adjacent split electrodes.

The insulating spacing can take a value of several tens μm to several hundreds μm depending on factors, such as an applied voltage. In such a case of providing an insulating spacing, however, an insufficient voltage is applied to the photoconductor layer and the liquid crystal layer at the part in superposition with the insulating spacing, thus being liable to leave locally unclear written image.

Now, a second embodiment of the display apparatus according to the present invention for obviating the above-mentioned difficulty will be described.

Figure 10:
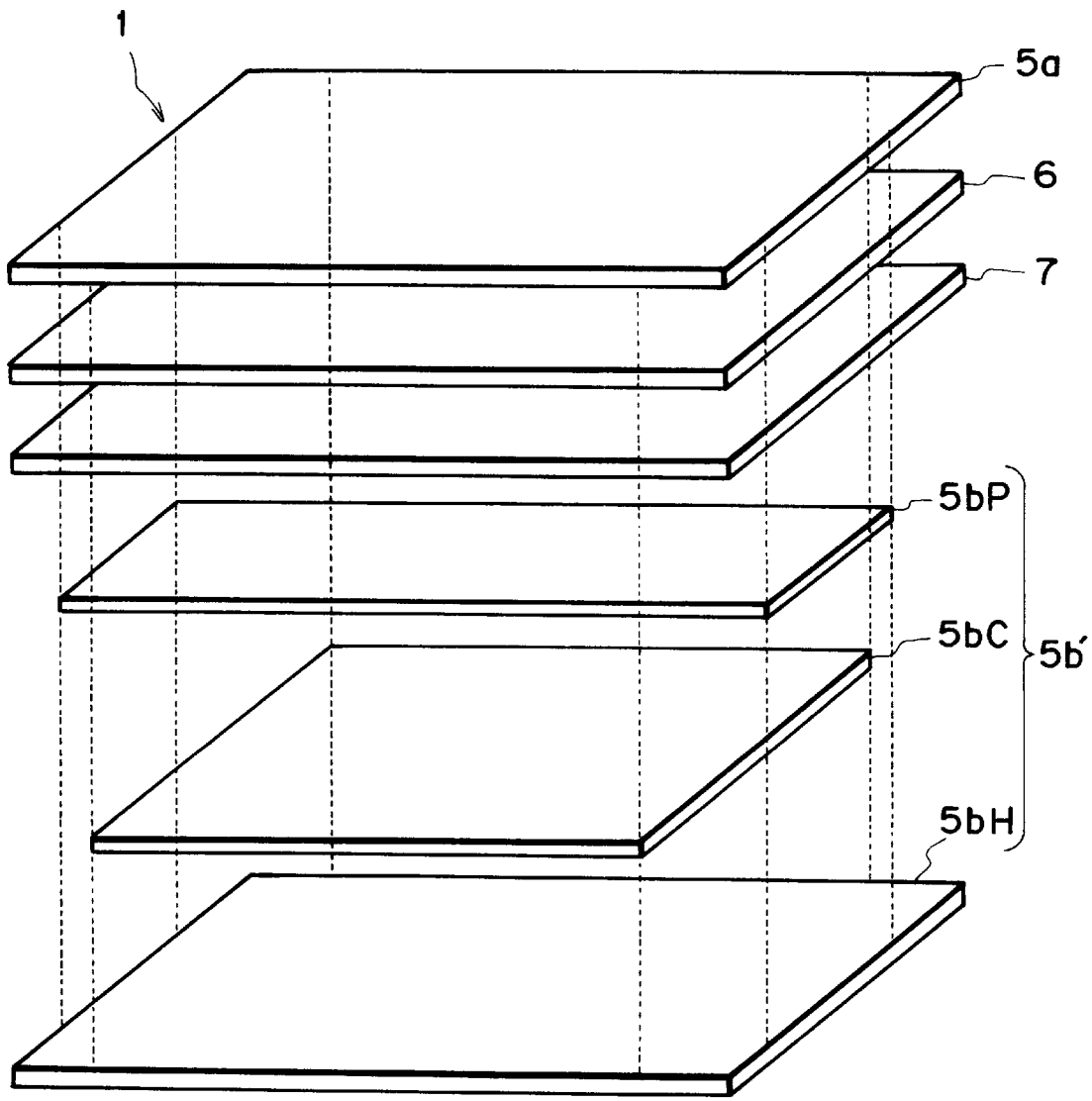
FIG. 10 is a schematic explosive perspective illustration of a portion of spatial light modulator constituting a second embodiment of the display apparatus according to the invention.

FIG. 10 is a schematic explosive perspective illustration of a portion of SLM constituting the second embodiment of the display apparatus, wherein a first transparent electrode 5a, a photoconductor layer 6, a liquid crystal layer 7 and a second transparent electrode unit 5b' are selectively shown.

As shown in FIG. 10, the second transparent electrode unit 5b' in this embodiment has a three-layer laminate structure including an H-size transparent electrode 5bH for H-size writing, a C-size transparent electrode 5bH for C-size writing and a P-size transparent electrode 5bP for P-size writing.

By using such a laminate second transparent electrode unit 5b' no insulating spacing is present in picture areas of respective picture sizes so that the occurrence of unclear image portion can be obviated. The transparent electrodes 5bH, 5bC and 5bP have to be mutually electrically insulated from each other, so that insulating layers are inserted between the respective electrode layers while they are not shown in FIG. 10.

The operation of control means 21 in a static picture display apparatus including SLM 1 having such a laminate transparent electrode unit structure will be described with respect to different features from those described with reference to the first embodiment.

Regarding an entire sequence as described with reference to FIG. 7, at a step 14 for picture resetting, the H-size transparent electrode 5bH is selected to apply a reset voltage regardless of a current picture written in SLM 1.

Regarding a picture writing sequence described with reference to FIG. 8, the H-size transparent electrode 5bH is selected at a step 104, the C-size transparent electrode 5bC is selected at a step 111, and the P-size transparent electrode 5bP is selected at a step 113, respectively.

Figure 11:
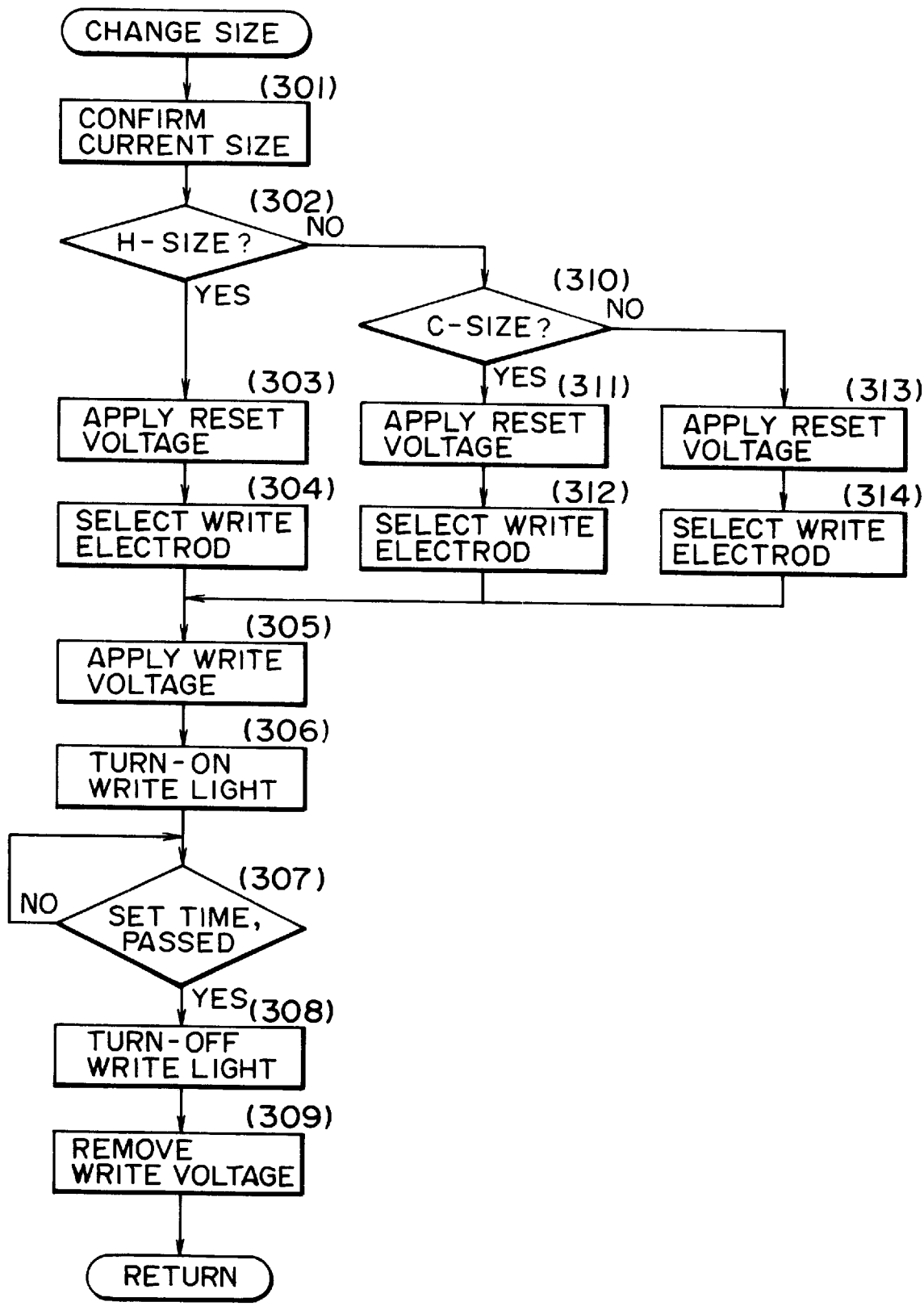
FIG. 11 is a flow chart for illustrating a picture size-changing sequence performed by using the modulator shown in FIG. 10.

The picture size change sequence is performed in a manner as described below with reference to a flow chart of FIG. 11 instead of FIG. 9.

In case of picture size change, a current picture size written in SLM 1 is confirmed (step 301), and whether or not it is H-size is checked (step 302). At this time, unlike in the first embodiment, a sequence of once-resetting the current picture and then rewriting a new picture is required even in the case of size change from H-size.

Accordingly, if the current size is confirmed to be H-size (Y at step 302), control signals are supplied to the voltage application means 9 and the voltage selection means 18 to apply a reset voltage of a polarity opposite to that of the writing voltage to the H-size transparent electrode 5bH (step 303), thereby entirely erasing the picture already written in SLM 1.

Then, depending on the picture size after the picture size change, the C-size transparent electrode 5bC for C-size or the P-size transparent electrode 5bP for P-size is selected as a writing electrode (step 304) by applying a control signal to the electrode selection means 18. Then, a control signal is applied to the voltage application means 9 to apply a writing voltage to the selected transparent electrode 5bC or 5bP (step 305). Further, the writing light source 10 is turned on (step 306), thereby starting projection of a picture on the film 13 onto SLM 1.

After lapse of a prescribed time required for picture writing (Y at step 307), the writing light source 10 is turned off (step 308), and the control signal output to the voltage application means 9 is terminated to remove the application of the writing voltage to the selected transparent electrode (step 309), thereby completing the rewriting into SLM 1 after the size change.

On the other hand, if the current size is not H-size (N at step 302), whether or not the current size is C-size is then checked (step 301), and if yes (Y at step 310), control signals are supplied to the voltage application means 9 and the voltage selection means 18 to apply a reset voltage of a polarity opposite to that of the writing voltage to the H-size transparent electrode 5bH (step 311), thereby erasing the picture already written in SLM 1.

Then, depending on the picture size after the picture size change, the H-size transparent electrode 5bH for H-size or the P-size transparent electrode 5bP for P-size is selected as a writing electrode (step 312) by applying a control signal to the electrode selection means 18. Thereafter, the sequence of the step 305 and following is followed to effect the rewriting after the picture size change.

On the other hand, if the current size is not C-size at step 310 (N at step 310), the current size is judged to be P-size, and control signals are supplied to the voltage application means 9 and the voltage selection means 18 to apply a reset voltage of a polarity opposite to that of the writing voltage to the H-size transparent electrode 5bH (step 313), thereby erasing the picture already written in SLM 1.

Then, depending on the picture size after the picture size change, the H-size transparent electrode 5bH for H-size or the C-size transparent electrode 5bC for C-size is selected as a writing electrode (step 314) by applying a control signal to the electrode selection means 18. Thereafter, the sequence of the step 305 and following is followed to effect the rewriting after the picture size change.

In SLM 1 shown in FIG. 10 according to the second embodiment, the electrode spacing between the first transparent electrode 5a and a selected one of the respective sizes of transparent electrodes 5bH, 5bC and 5bP selected at the time of writing can be different depending on which of 5bH, 5bC and 5bP is selected due to the thicknesses of such a transparent electrode layer and an insulating layer. Accordingly, if a constant writing voltage is applied regardless of a selected electrode, a writing voltage effectively applied to the photoconductor layer and the liquid crystal layer can delicately vary, thus being liable to adversely affect the quality of written images.

In order to alleviate such an adverse effect, it is possible to vary the writing voltage depending on which of the respective sizes of transparent electrodes 5bH, 5bC and 5bP is selected. More specifically, it is preferred to apply a higher writing voltage to the H-size transparent electrode 5bH providing a larger electrode spacing and a lower writing voltage to the P-size transparent electrode 5bP providing a smaller electrode spacing so as to apply a substantially constant effective voltage to the photoconductive layer 6 and the liquid crystal layer 7.

As described above, according to the present invention, some split electrodes (or transparent electrode) may be selected from a plurality of split electrodes (or transparent electrodes) depending on a picture size selection means, and a voltage application means is controlled to apply a voltage to the selected split electrodes (or transparent electrode), thereby writing a picture of selected picture size in a spatial light modulator. As a result, a picture size change becomes possible without using a mask means separate from the spatial light modulator, thus providing a compact and inexpensive static picture display apparatus allowing films (or recording media) carrying different sizes of pictures to be viewed.

What is claimed is:

1. A display apparatus, comprising:
   a spatial light modulator capable of writing therein and displaying a picture, a recording medium carrying a recorded image and disposed in front of the spatial light modulator, and a writing light source disposed in a position suitable for emitting writing light and illuminating the recording medium with the writing light to project the recorded image onto the spatial light modulator, wherein
   said spatial light modulator comprises a pair of transparent substrates disposed with a prescribed gap therebetween and each having thereon a transparent electrode, and a liquid crystal layer and a photoconductor layer disposed between the substrates, the transparent electrode on one substrate being split into a plurality of split electrodes having respectively prescribed areas, and said display apparatus further includes:
      voltage application means for applying a writing voltage to the plurality of split electrodes independently;
      picture size selection means for selecting a size of picture displayed on the spatial light modulator based on picture size data recorded in the recording medium;
      electrode selection means for selecting a number of split electrodes in combination for writing voltage application depending on the selected picture size; and
      control means for controlling the voltage application means so as to select the number of split electrodes for writing voltage application based on an output of the picture size selection means and corresponding to the selected picture size, controlling said voltage application means to apply the writing voltage to the selected number of split electrodes, and controlling the writing light source so as to illuminate the recording medium and project the recorded image thereon as a writing image onto the spatial light modulator.

2. A display apparatus according to claim 1, wherein said picture size selection means includes readout means for reading the picture size data recorded in the recording medium.

3. A display apparatus according to claim 1, wherein said picture size selection means includes a picture size change means for changing the picture size to be displayed, and said control means controls the electrode selection means so as to select the number of split electrodes for writing voltage application corresponding to a picture size changed based on an output of the picture size change means and controls the voltage application means so as to apply a voltage selectively to the selected number of split electrodes.

4. A display apparatus according to claim 1, wherein said control means controls the voltage application means so as to apply mutually different voltages to the selected number of split electrodes and a non-selected number of split electrodes, respectively.

5. A display apparatus according to claim 4, wherein the voltage applied to the selected number of split electrodes is lower than the voltage applied to the non-selected number of split electrodes.

6. A display apparatus, comprising:
   a spatial light modulator capable of writing therein and displaying a picture, a recording medium carrying a recorded image and disposed in front of the spatial light modulator, and a writing light source disposed in a position suitable for emitting writing light and illuminating the recording medium with the writing light to project the recorded image onto the spatial light modulator, wherein
   said spatial light modulator comprises a pair of transparent substrates disposed with a prescribed gap therebetween and each having thereon a transparent electrode, and a liquid crystal layer and a photoconductor layer disposed between the substrates, the transparent electrode on one substrate comprising a plurality of transparent electrode layers having mutually different planar sizes and laminated with each other;
   voltage application means for applying a writing voltage to the plurality of transparent electrode layers independently from each other;
   picture size selection means for selecting a size of picture displayed on the spatial light modulator,
   electrode selection means for selecting a transparent electrode layer for writing voltage application depending on the selected picture size; and
   control means for controlling the voltage application means so as to select the transparent electrode layer for writing voltage application based on an output of the picture size selection means and corresponding to the selected picture size, controlling said voltage application means to apply the writing voltage to the selected transparent electrode layer, and controlling the writing light source so as to illuminate the recording medium and project the recorded image thereon as a writing image onto the spatial light modulator.

7. A display apparatus according to claim 6, wherein said picture size selection means includes readout means for reading picture size data recorded in the recording medium.

8. A display apparatus according to claim 6, wherein said control means controls the voltage application means so as to change the applied voltage depending on the selected transparent electrode layer.

9. A display apparatus according to claim 8, wherein said control means controls the voltage application means so as to apply a larger voltage when a transparent electrode layer giving a larger spacing from the transparent electrode on the other substrate is selected.

* * * * *

UNITED STATES PATENT AND TRADEMARK OFFICE
CERTIFICATE OF CORRECTION

PATENT NO.   : 6,411,270 B1
DATED        : June 25, 2002
INVENTOR(S)  : Toshifumi Ohsawa It is certified that error appears in the above-identified patent and that said Letters Patent is hereby corrected as shown below:

<u>Title page,</u>
Item [56], References Cited, FOREIGN PATENT DOCUMENTS,
"2000131662" should read -- 2000-131662 --.

<u>Column 6,</u>
Line 3, "the-frame" should read -- the frame --.

Signed and Sealed this

Twenty-first Day of January, 2003

JAMES E. ROGAN
*Director of the United States Patent and Trademark Office*